No. 619,140. Patented Feb. 7, 1899.
A. W. COFFIN.
SEAL LOCK.
(Application filed Nov. 9, 1898.)
(No Model.)
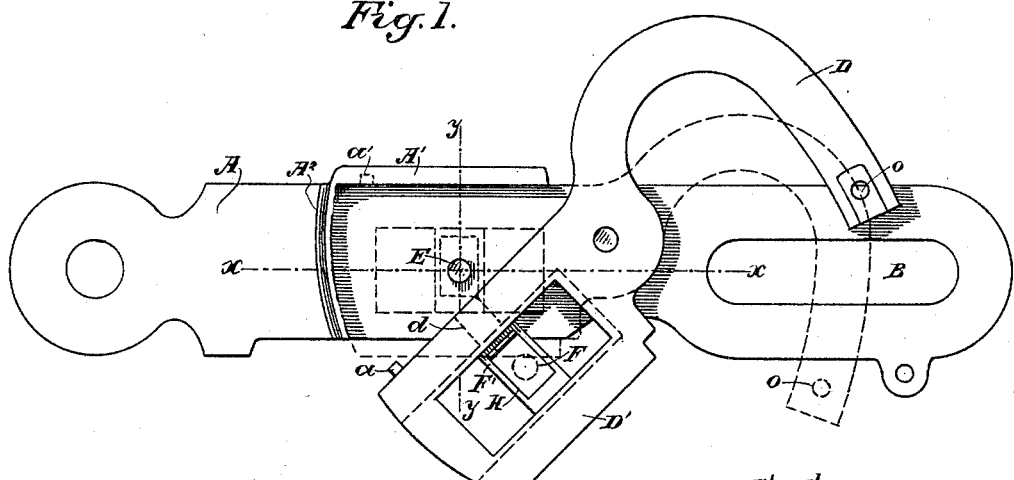
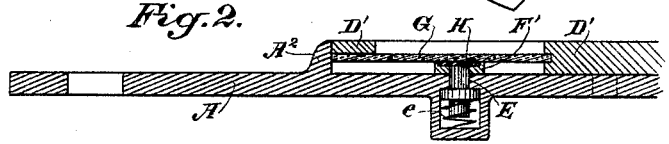
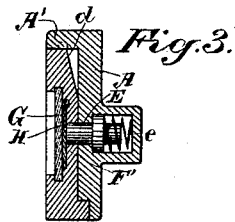
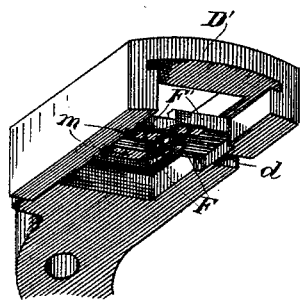
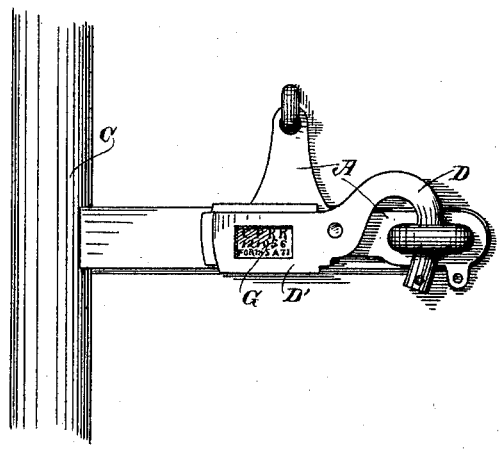
Witnesses:
Inventor,
Arthur W. Coffin
By Dewey Strong & Co.,
Attys

United States Patent Office.

ARTHUR W. COFFIN, OF SAN FRANCISCO, CALIFORNIA.

SEAL-LOCK.

SPECIFICATION forming part of Letters Patent No. 619,140, dated February 7, 1899.

Application filed November 9, 1898. Serial No. 695,915. (No model.)

*To all whom it may concern:*

Be it known that I, ARTHUR W. COFFIN, a citizen of the United States, residing in the city and county of San Francisco, State of California, have invented an Improvement in Seal-Locks; and I hereby declare the following to be a full, clear, and exact description of the same.

My invention relates to a device for locking and sealing cars, rooms, and receptacles generally; and it is especially designed for use upon freight-cars where it is desirable to seal the doors to prevent any removal of or tampering with goods contained therein.

It consists in the parts and the constructions and combinations of parts hereinafter described and claimed.

Figure 1 is a view of the hasp with the hook turned in position to allow it to be fitted over the staple. The dotted lines show it locked. Fig. 2 is a horizontal section on line $x\ x$ of Fig. 1. Fig. 3 is a similar section on line $y\ y$ of Fig. 1, showing the construction for the insertion of the destructible protecting-plate. Fig. 4 is a bottom view of the hook extension, showing also the device to prevent the engagement of the pin with the hook when no sealing is intended. Fig. 5 shows the application of the device to that class of fastenings in which the hasp or its equivalent is connected with a vertically-journaled turnable rod or bar.

A is the hasp, having at one end the slot B, which is adapted to fit over the staple projecting from one of the parts of the closure. This hasp may be loosely attached to a staple upon the other part, so that it is movable about this point of support, or it may be fixed, as shown in Fig. 5, to a vertically-journaled and turnable rod C, such as is used in some classes of car-door fastenings. In either event the hasp can be placed over the staple or removed therefrom at will. In order to lock the hasp when thus placed, I have shown a hook D pivoted to the hasp or in such proximity thereto that when the hasp is placed over the holding-staple the hook may be passed through the staple exterior to the hasp, and thus hold it in place.

In order to secure the hook to prevent it from being again lifted, I have shown a spring-pressed pin E, journaled and slidable transversely on the hasp, and a corresponding hole F is made in the extension D' of the hook D, which, being turnable about the pivot or supporting point of the hook, may be moved in such an arc as to bring the hole F in line with the pin E, when the pin will be forced forward by its spring $e$, properly incased upon the hasp, and the pin will thus engage with the hole in the hook extension and prevent its being moved until the pin has been depressed sufficiently to allow the hook to be turned about its pivot or suspending point. As the pin is normally pressed outward by its spring, I have shown a small inclined or beveled slot at $d$ in the side of the hook extension, which, passing over the pin when the hook is turned, will press the pin down until it is in line with the hole F.

When it is desired to release the hook, it is only necessary to press upon the head of the pin E to retract it from the hole F to allow the hook to be lifted. In order to prevent this being done except by station-agent or other authorized person, I make the extension D' of the hook of sufficient thickness, and the hole F is made through a bar F', which extends across an opening made through the extension D', said bar being at the bottom of the opening and having a less thickness than the depth or thickness of the part D'. This leaves a space above the bar F', which has a groove or channel adapted to receive a destructible plate G, and when this plate is slipped into place it covers the bar F' with the hole F and the head of the pin E and prevents any access thereto. I prefer to make this plate of glass of sufficient thickness and strength so that it will not be broken accidentally, and when the parts are locked it will be impossible to disengage the pin E and allow the hook to be disengaged from its staple without breaking or destroying the glass or other protecting plate.

Upon the hasp A is an upwardly-projecting plate A', against which the back of the extension D' contacts when the hook has been fully inserted in the staple and the pin E has engaged and locked in the hole F.

$a$ is a small pin fixed upon the back of the extension D' and adapted to enter a hole $a'$, made in the corresponding face of the lug or projection A.'

The glass or other destructible plates are introduced into their grooves or channels in the part D' from the rear end thereof, the slot being opened at this end, as plainly shown in Figs. 2 and 4.

A² is a curved upwardly-projecting ledge or flange fixed to or formed with the hasp, the curvature being concentric with the pivot about which the hook D D' turns, and the rear end of the part D' is correspondingly curved, so that when the hook is inserted in the staple and the parts closed this end will be protected and the slot in it concealed by the flange A². It will thus be seen that when the hook is raised from the staple, as shown in Fig. 1, the end of the part D' will be exposed and a destructible plate can be inserted, after which the hasp being placed over the staple the hook may be inserted into the staple, and as it is pressed down the incline d in the top of the part D' will depress the pin E, allowing it to pass beneath the bar F' until it arrives at the hole F, when it will be forced into the hole by its spring and the parts locked. The end of the part D' being thus in contact with the flange A², it will be impossible to reach or remove the destructible plate G. When it is desired to open the door, this plate must be destroyed by the station-keeper, when he can easily depress the pin and disengage the hook from the staple. These destructible plates will be kept on hand by station-keepers and will be made of material in a peculiar way, so as not to be easily imitated by others.

In order to prevent tampering with the device by boring through the glass or other destructible plate and thus obtaining access to the head of the pin, I have shown a hardened, steel plate H, which is hinged or otherwise fitted so as to be folded down upon the bar F' beneath the destructible plate. This plate H is made sufficiently hard to resist the action of any drill which might be employed to perforate the glass or other destructible piece G.

To secure the parts by the hook without locking, it is desirable not to have the pin E engage with the plate F each time the hook is inserted in the staple, as that would make it necessary to disengage the pin whenever the door is to be opened. The plate F is therefore divided transversely through the hole F, and the part beneath which the pin E passes is mounted upon springs m, which lift it up, as shown in Fig. 4, when there is no destructible plate in position. These springs lift it high enough to prevent the pin E being engaged when it arrives opposite the hole, and the hook can thus be used to secure the door and be unfastened without drepressing the pin E each time.

When the parts are to be permanently locked, the destructible plate is inserted above the plate F', and it then depresses the independent portion to the level of the fixed portion, in which position it is in readiness to engage and hold the pin E.

A hole o is made through the end of the hook and an adjacent part of the hasp, so that the ordinary wire seal may be used, if desired.

Having thus described my invention, what I claim as new, and desire to secure by Letters Patent, is—

1. A car lock or seal consisting of a hasp and staple attached respectively to the fixed and movable parts of the closure, a hook pivoted or fulcrumed with relation to the hasp so that it may drop through the staple or be removed therefrom and having an extension with an opening therein, a channel and a destructible plate adapted to fit therein above said opening, and a spring-pressed pin movable transversely upon the hasp and engaging the opening in the hook extension when the parts are in locked position.

2. A car lock and seal consisting of a hasp and staple connected respectively with the fixed and movable parts of the closure, a hook pivoted with relation to the hasp so that it may turn about its pivot-point to engage with or disengage from the staple after the staple has been placed over the latter, an extension of the hook having a channeled slot or opening made through it, a destructible plate adapted to fit said channel or slot and be retained therein, a bar extending across the opening beneath the destructible plate having a hole made therethrough, a spring-pressed pin movable transversely upon the hasp and adapted to engage the hole in the transverse bar when the hook has been inserted in the staple, and flanges against which the end and side of the hook extension contact when the parts are closed whereby the slot or channel containing the destructible plate is covered and protected.

3. A car lock and seal consisting of a hasp and a staple attached respectively to the fixed and movable parts of the closure, a hook pivoted with relation to the staple so that it may be introduced or removed when the hasp is in place, an extension of said hook having an open slot made through it, a transverse bar with a hole therethrough and a channel opening into the slot above the transverse bar, a destructible plate adapted to fit said channel and cover the hole in the bar, a hardened protecting-plate connected with the bar and covering the hole beneath the destructible plate, a spring-pressed pin movable transversely through the hasp and in the line of movement of the hook extension, said pin being adapted to enter the hole in the transverse bar and lock the hook in engagement with the staple and flanges against which the open slot or channel of the hook extension contacts when the parts are locked substantially as described.

4. In a car lock and seal of the character described, the securing-hook having a transverse bar with a hole adapted to be engaged by a spring-pressed bolt, said bar having a movable spring-pressed section by which it is normally raised out of the line of travel of the locking-bolt.

5. In a car lock and seal of the character described, the securing-hook with chambered extension with a two-part bar extending across it having a hole through the junction of the two parts, a spring-pressed pin in the line of travel of said hole, springs by which the movable part of the bar is raised out of engagement with the pin, and a plate fitting the chamber above the bar and holding the two parts in line when the plate is in place.

In witness whereof I have hereunto set my hand.

ARTHUR W. COFFIN.

Witnesses:
A. A. HINCHMAN,
T. A. DUFFY.